United States Patent
Lee et al.

(10) Patent No.: US 11,936,449 B2
(45) Date of Patent: Mar. 19, 2024

(54) METHOD AND APPARATUS FOR HIGH RESOLUTION CSI CODEBOOK

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/709,115

(22) Filed: Mar. 30, 2022

(65) Prior Publication Data

US 2022/0329297 A1    Oct. 13, 2022

Related U.S. Application Data

(60) Provisional application No. 63/170,254, filed on Apr. 2, 2021.

(51) Int. Cl.
*H04B 7/0456* (2017.01)
*H04B 7/06* (2006.01)

(52) U.S. Cl.
CPC ......... *H04B 7/0482* (2013.01); *H04B 7/0626* (2013.01)

(58) Field of Classification Search
CPC .. H04B 7/0626; H04B 7/0482; H04B 7/0417; H04B 7/0478; H04B 7/0658
See application file for complete search history.

(56) References Cited

U.S. PATENT DOCUMENTS

| | | | |
|---|---|---|---|
| 2018/0076871 A1* | 3/2018 | Rahman | H04B 7/0626 |
| 2019/0052335 A1 | 2/2019 | Rahman et al. | |
| 2021/0099210 A1 | 4/2021 | Ramireddy et al. | |

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

(Continued)

Primary Examiner — Sophia Vlahos

(57) ABSTRACT

Apparatuses and methods for high resolution CSI codebook is provided. The method includes receiving configuration information about a channel state information (CSI) report, the configuration information including a parameter $d \geq 1$, where d is a number of principal components; determining left principal component vectors; determining right principal component vectors; determining principal singular values; and transmitting the CSI report including a precoding matrix indicator (PMI), the PMI indicating the left principal component vectors, the right principal component vectors, and the principal singular values, wherein at least one of the left principal component vectors, the right principal component vectors, and the principal singular values are selected from adaptive codebooks.

20 Claims, 11 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.
"LTE; Evolved Universal Terrestrial Radio Access (E-UTRA); Medium Access Control (MAC) protocol specification (3GPP TS 36.321 version 16.6.0 Release 16)", ETSI TS 136 321 V16.6.0, Oct. 2021, 144 pages.
"LTE; Evolved Universal Terrestrial Radio Access (E-UTRA); Radio Resource Control (RRC); Protocol specification (3GPP TS 36.331 version 16.7.0 Release 16)", ETSI TS 136 331 V16.7.0, Jan. 2022, 1099 pages.
"3rd Generation Partnership Project; Technical Specification Group Radio Access Network; NR; Physical channels and modulation (Release 17)", 3GPP TS 38.211 V17.0.0, Dec. 2021, 134 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for control (Release 17)", 3GPP TS 38.213 V17.0.0, Dec. 2021, 225 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
"3rd Generation Partnership Project; Technical Specification Group Radio Access Network; NR; Physical layer measurements (Release 17)", 3GPP TS 38.215 V17.0.0, Dec. 2021, 26 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
International Search Report and Written Opinion dated Jun. 23, 2022 regarding International Application No. PCT/KR2022/004711, 8 pages.
Jiang et al., "A Codebook-Adaptive Feedback Algorithm for Cellular-Based Positioning", IEEE Access, vol. 6, Jun. 2018, pp. 32109-32116.
Benmimoune et al., "PCA-Aided Precoding for Correlated MIMO Broadcast Channels", 2019 IEEE Global Conference on Signal and Information Processing (GlobalSIP), Nov. 2019, 4 pages.
Zhu et al., "HOSVD-based Limited Feedback and Precoding Design for Massive MIMO Systems", 2016 IEEE/CIC International Conference on Communications in China (ICCC Workshops), Jul. 2016, 6 pages.

* cited by examiner

METHOD AND APPARATUS FOR HIGH RESOLUTION CSI CODEBOOK

CROSS-REFERENCE TO RELATED APPLICATIONS AND CLAIM OF PRIORITY

The present application claims priority to U.S. Provisional Patent Application No. 63/170,254, filed on Apr. 2, 2021. The content of the above-identified patent document is incorporated herein by reference.

TECHNICAL FIELD

The present disclosure relates generally to wireless communication systems and more specifically to methods and apparatus for high resolution CSI codebook.

BACKGROUND

For a cellular system operating in a sub-1 GHz frequency range (e.g., less than 1 GHz), supporting a large number of CSI-RS antenna ports (e.g., 32) at a single location or remote radio head (RRH) is challenging due to the fact that a larger antenna form factor size is needed at these frequencies than a system operating at a higher frequency such as 2 GHz or 4 GHz. At such low frequencies, the maximum number of CSI-RS antenna ports that can be co-located at a single site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple locations (or panels/RRHs). The multiple sites or panels/RRHs can still be connected to a single (common) base unit, hence the signal transmitted/received via multiple distributed RRHs can still be processed at a centralized location.

SUMMARY

Embodiments of the present disclosure provide methods and apparatuses for high resolution codebook in a wireless communication system.

In one embodiment, a UE in a wireless communication system is provided. The UE includes a transceiver configured to receive configuration information about a channel state information (CSI) report, the configuration information including a parameter $d \geq 1$, where d is a number of principal components. The UE further includes a processor operably coupled to the transceiver. The processor is configured to: determine left principal component vectors; determine right principal component vectors; and determine principal singular values, wherein the transceiver is further configured to transmit the CSI report including a precoding matrix indicator (PMI), the PMI indicating the left principal component vectors, the right principal component vectors, and the principal singular values, wherein at least one of the left principal component vectors, the right principal component vectors, and the principal singular values are selected from adaptive codebooks.

In another embodiment, a BS in a wireless communication system is provided. The BS includes a processor configured to generate configuration information about a CSI report, the configuration information including a parameter $d \geq 1$, where d is a number of principal components. The BS further includes a transceiver operably coupled to the processor. The transceiver is configured to: transmit the configuration information; and receive the CSI report including a PMI, the PMI indicating left principal component vectors, right principal component vectors, and principal singular values, wherein at least one of the left principal component vectors, the right principal component vectors, and the principal singular values are based on adaptive codebooks.

In yet another embodiment, a method for operating a UE is provided. The method comprises: receiving configuration information about a CSI report, the configuration information including a parameter $d \geq 1$, where d is a number of principal components; determining left principal component vectors; determining right principal component vectors; determining principal singular values; and transmitting the CSI report including a PMI, the PMI indicating the left principal component vectors, the right principal component vectors, and the principal singular values, wherein at least one of the left principal component vectors, the right principal component vectors, and the principal singular values are selected from adaptive codebooks.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
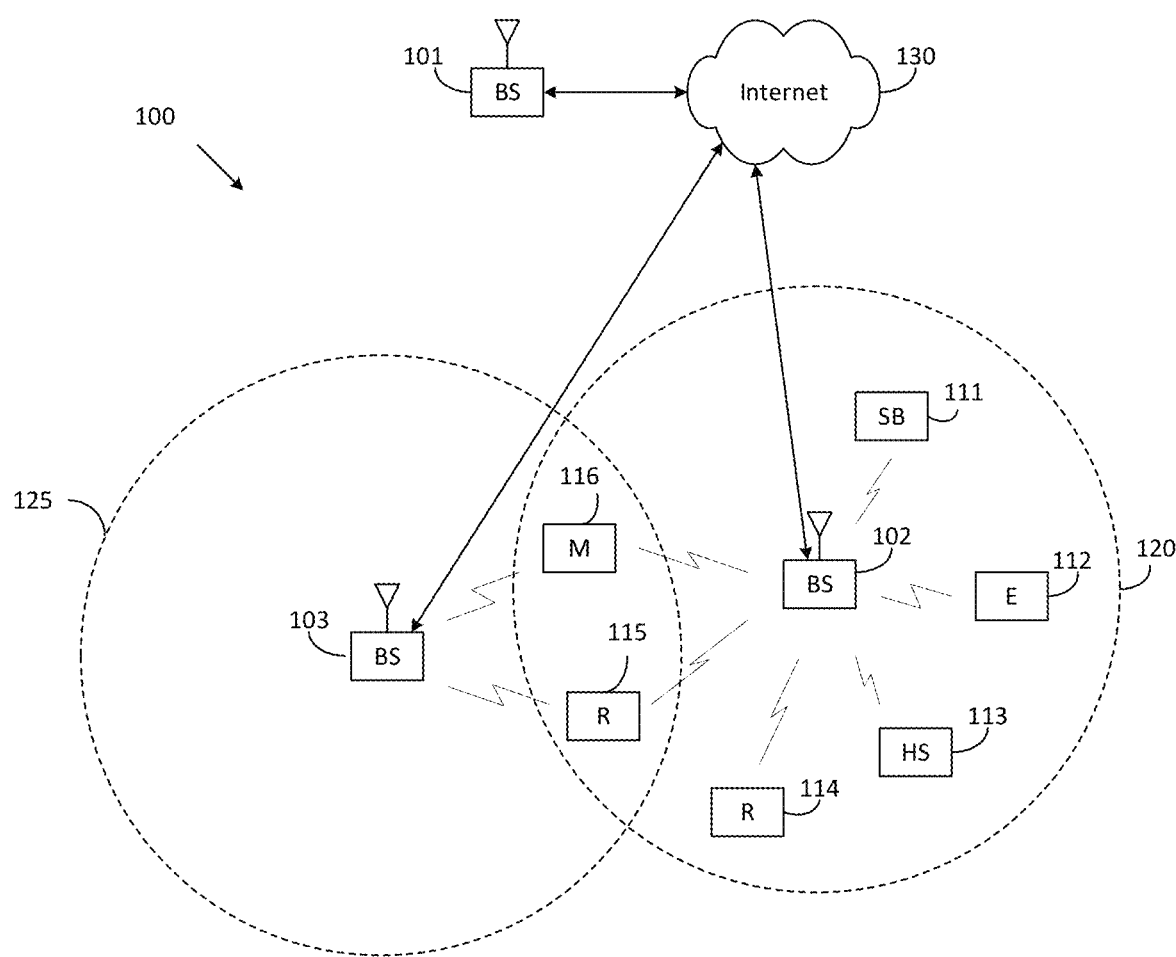
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v16.6.0, "E-UTRA, Medium Access Control (MAC) protocol specification" (herein "REF 4"); 3GPP TS 36.331 v16.7.0, "E-UTRA, Radio Resource Control (RRC) protocol specification" (herein "REF 5"); 3GPP TS 38.211 v17.0.0, "NR, Physical channels and modulation" (herein "REF 6"); 3GPP TS 38.212 v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v16.7.0, "NR, Medium Access Control (MAC) protocol specification" (herein "REF 11"); 3GPP TS 38.331 v16.7.0, and "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
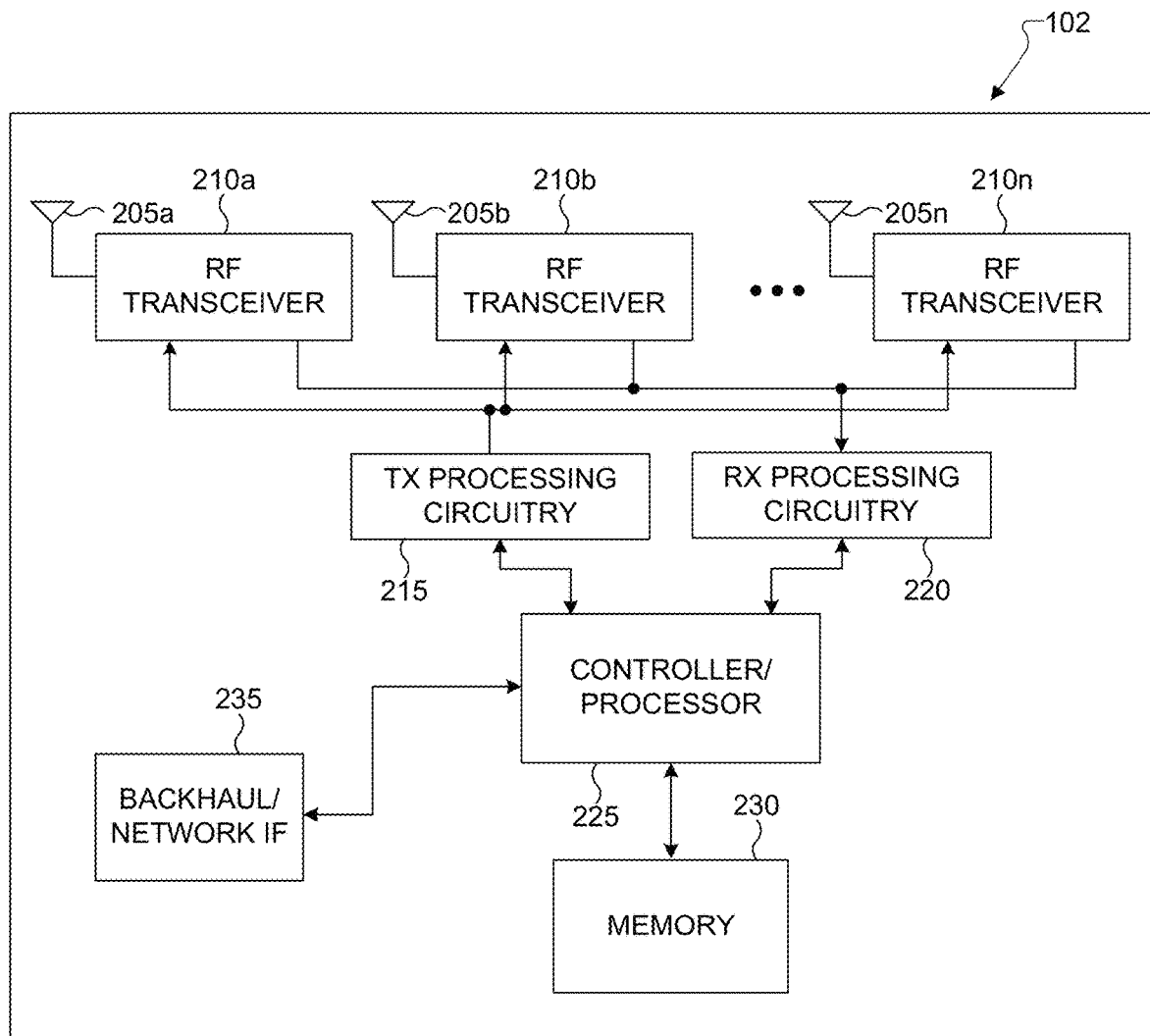
FIG. 2 illustrates an example gNB according to embodiments of the present disclosure.
Figure 3:
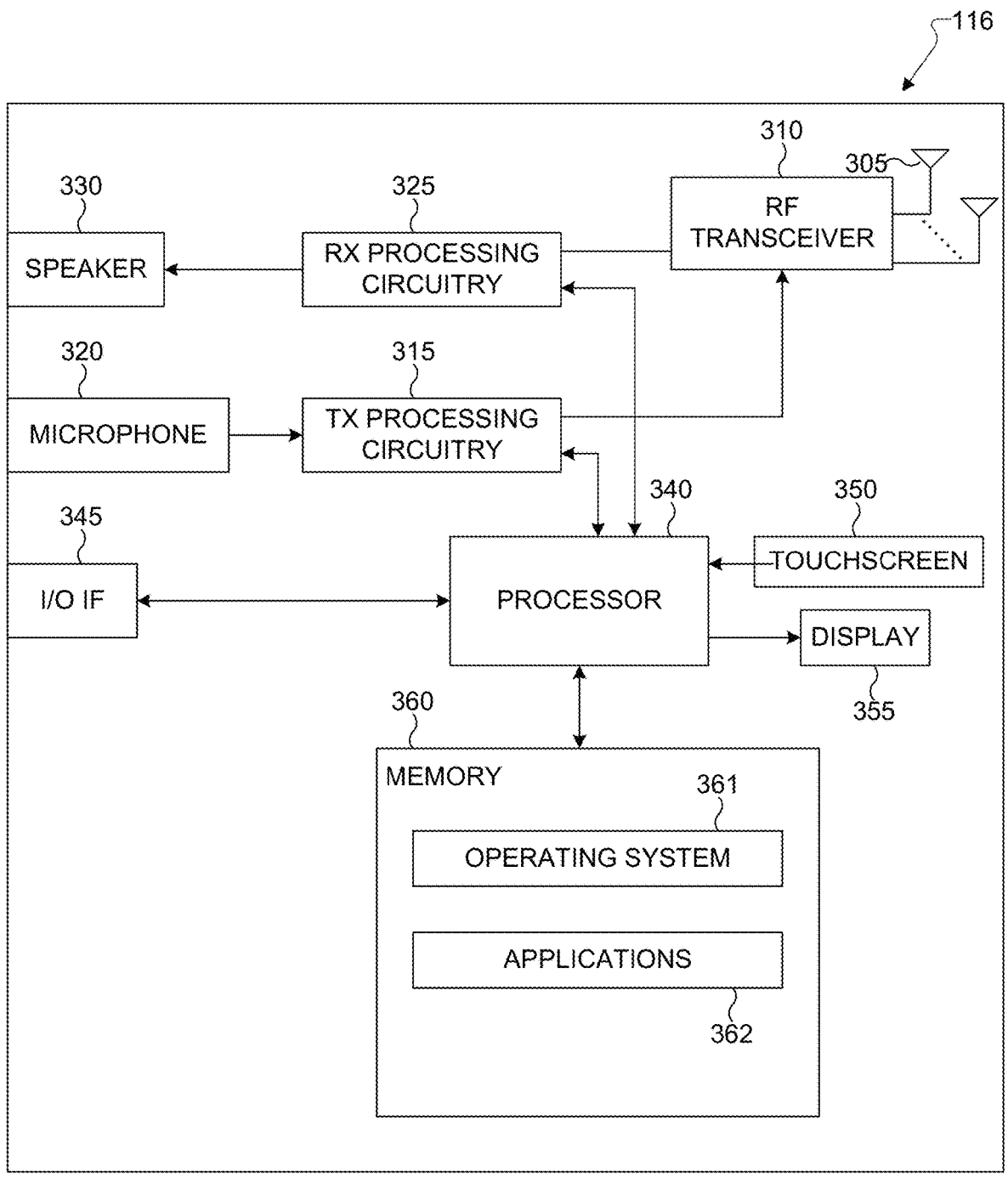
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about a channel state information (CSI) report, the configuration information including a parameter d≥1, where d is a number of principal components; determining left principal component vectors; determining right principal component vectors; determining principal singular values; and transmitting the CSI report including a precoding matrix indicator (PMI), the PMI indicating the left principal component vectors, the right principal component vectors, and the principal singular values, wherein at least one of the left principal component vectors, the right principal component vectors, and the principal singular values are selected from adaptive codebooks. One or more of the gNBs 101-103 includes circuitry, programing, or a combination thereof, for generating configuration information about a channel state information (CSI) report, the configuration information including a parameter d≥1, where d is a number of principal components; transmitting the configuration information; and receiving the CSI report including a precoding matrix indicator (PMI), the PMI indicating left principal component vectors, right principal component vectors, and principal singular values, wherein at least one of the left principal component vectors, the right principal component vectors, and the principal singular values are based on adaptive codebooks.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of DL channel signals and the transmission of UL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about a channel state information (CSI) report, the configuration information including a parameter d≥1, where d is a number of principal components; determining left principal component vectors; determining right principal component vectors; determining principal singular values; and transmitting the CSI report including a precoding matrix indicator (PMI), the PMI indicating the left principal component vectors, the right principal component vectors, and the principal singular values, wherein at least one of the left principal component vectors, the right principal component vectors, and the principal singular values are selected from adaptive codebooks. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
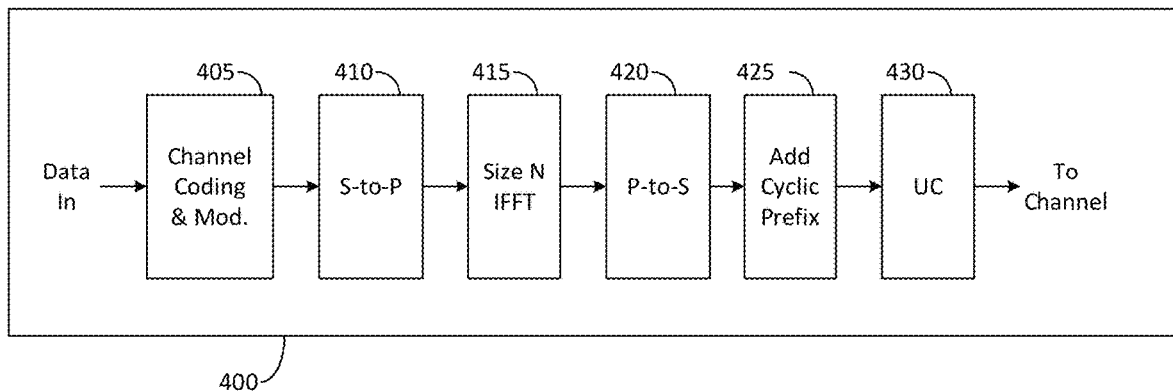
FIG. 4A illustrates a high-level diagram of an orthogonal frequency division multiple access transmit path according to embodiments of the present disclosure.
Figure 4B:
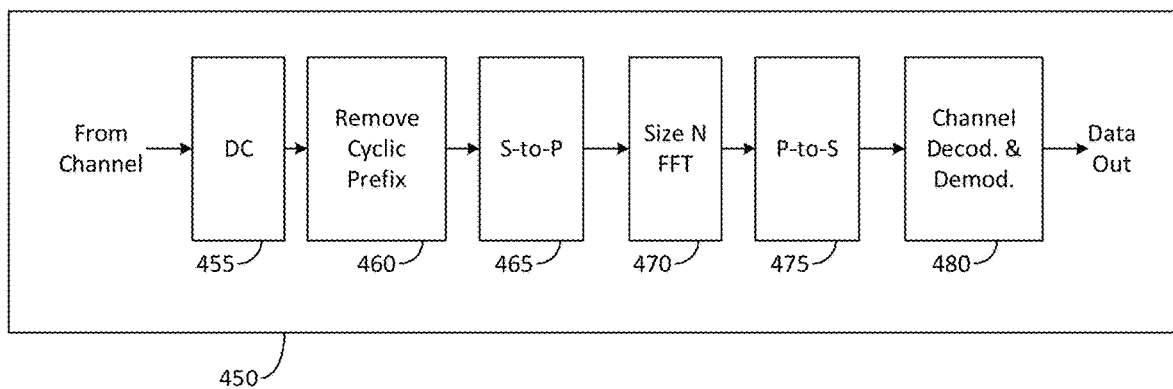
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s = (n_{s0} + y \cdot N_{EPDCCH})$ mod D RBs for a total of $Z = O_F + \lfloor (n_{s0} + y \cdot N_{EPDCCH}) D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB} = 1$. A last subframe symbol can be used to multiplex SRS transmissions from one or more UEs. A number of subframe symbols that are available for data/UCI/DMRS transmission is $N_{symb} = 2 \cdot (N_{symb}^{UL} - 1) - N_{SRS}$, where $N_{SRS} = 1$ if a last subframe symbol is used to transmit SRS and $N_{SRS} = 0$ otherwise.

Figure 5:
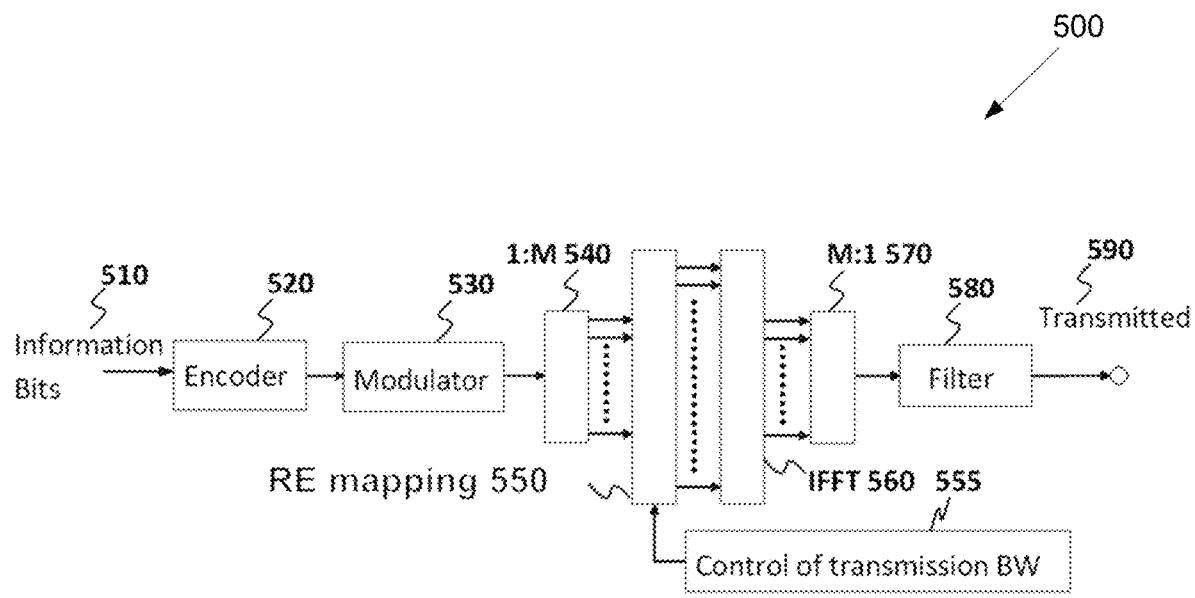
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
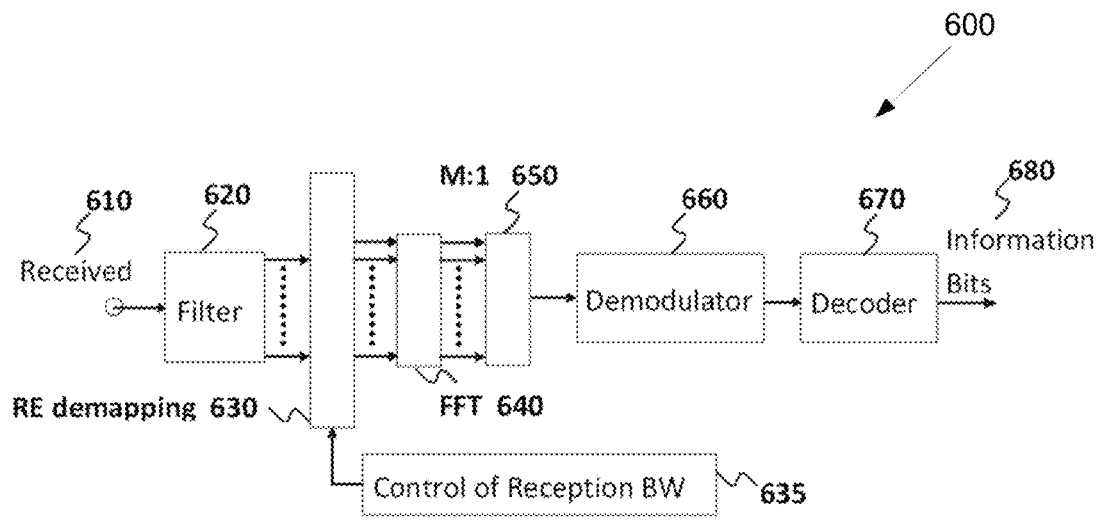
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
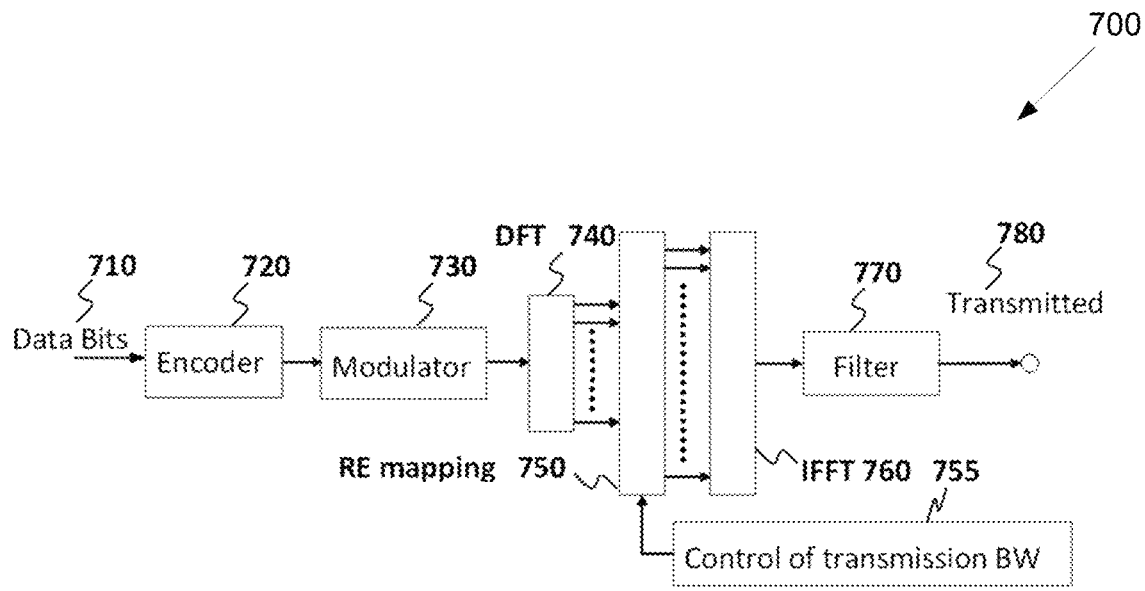
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
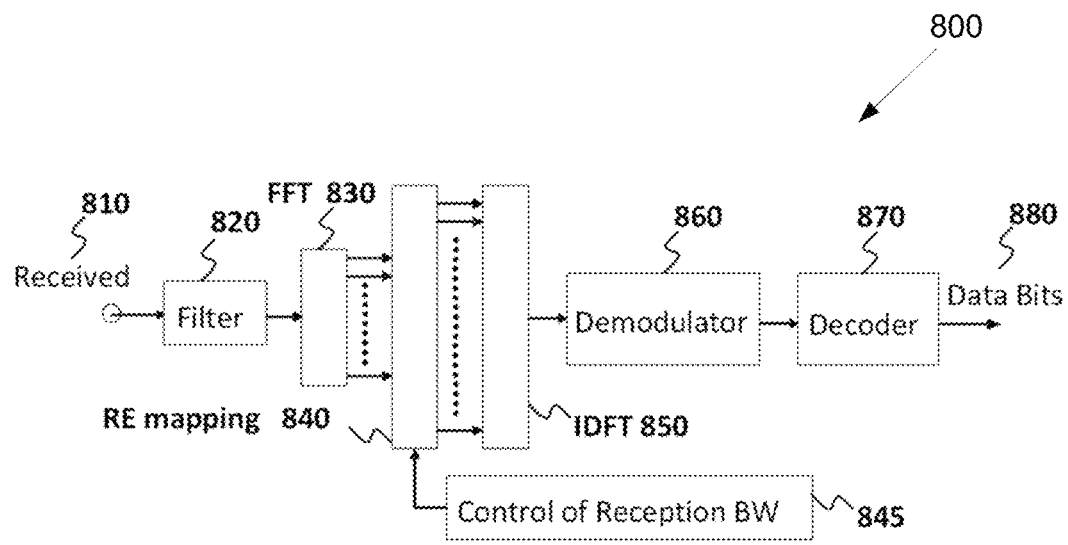
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
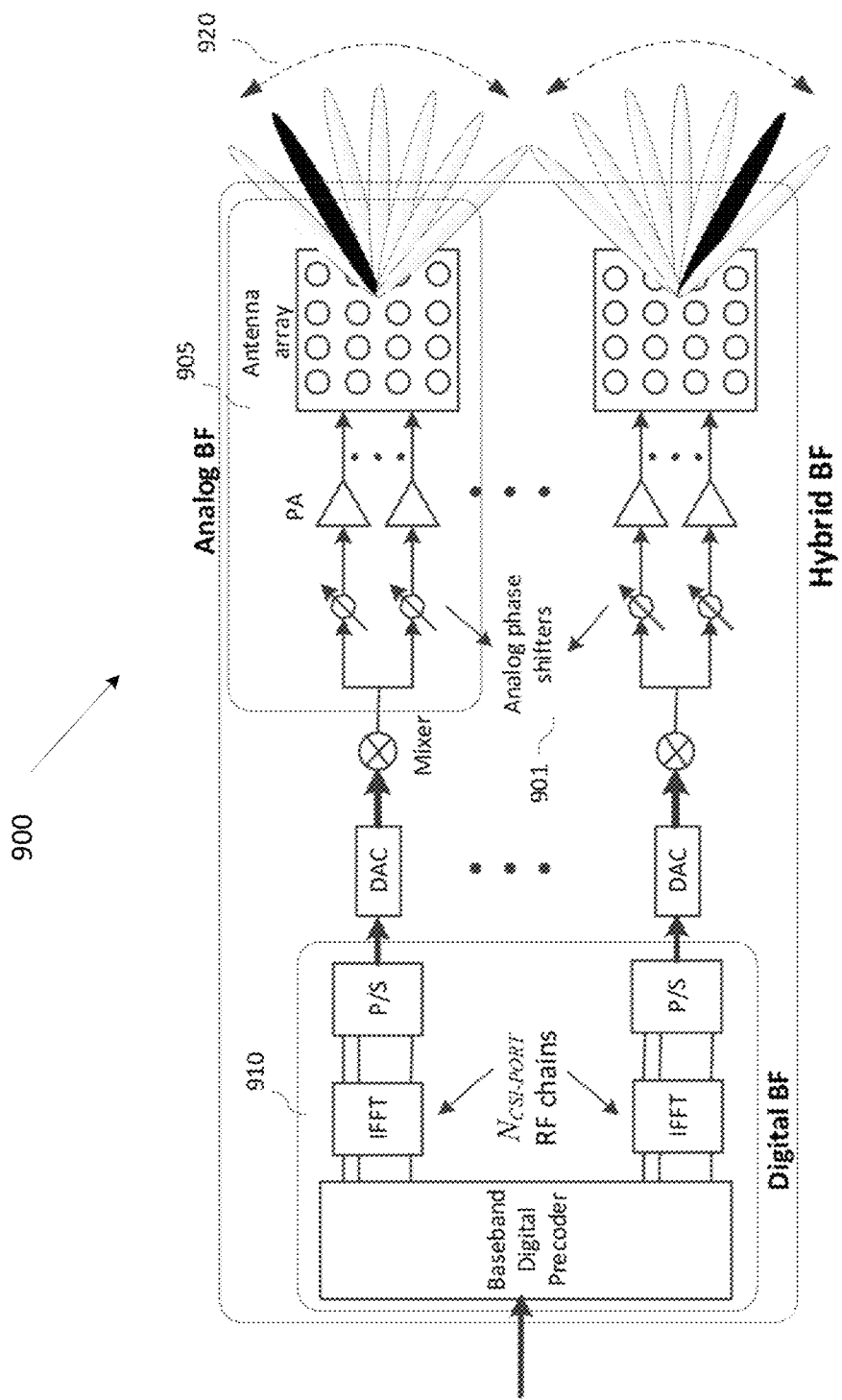
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel.14 LTE and Rel.15 NR specifications support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI\text{-}PORT}$. A digital beamforming unit 910 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

At lower frequency bands such as FR1 or particularly sub-1 GHz band, on the other hand, the number of antenna elements cannot be increased in a given form factor due to large wavelength. As an example, for the case of the wavelength size (λ) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

Figure 10:
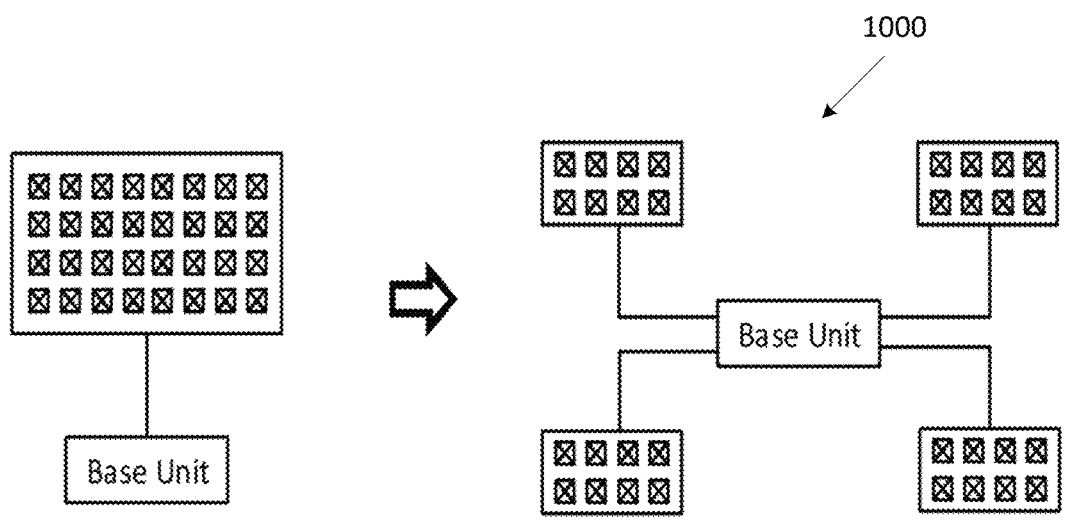
FIG. 10 illustrates an example D-MIMO system according to embodiments of the present disclosure.

FIG. 10 illustrates an example system for D-MIMO 1000 according to embodiments of the present disclosure. The embodiment of the example system for D-MIMO 1000 illustrated in FIG. 10 is for illustration only. FIG. 10 does not limit the scope of this disclosure to any particular implementation of the example system for D-MIMO 1000.

As illustrated in FIG. 10, one approach to resolve the issue described above is to form multiple antenna panels (e.g., antenna modules, RRHs) with a small number of antenna ports instead of integrating all of the antenna ports in a single panel (or at a single site) and to distribute the multiple panels in multiple locations/sites (or RRHs), as illustrated in FIG. 18.

Figure 11:
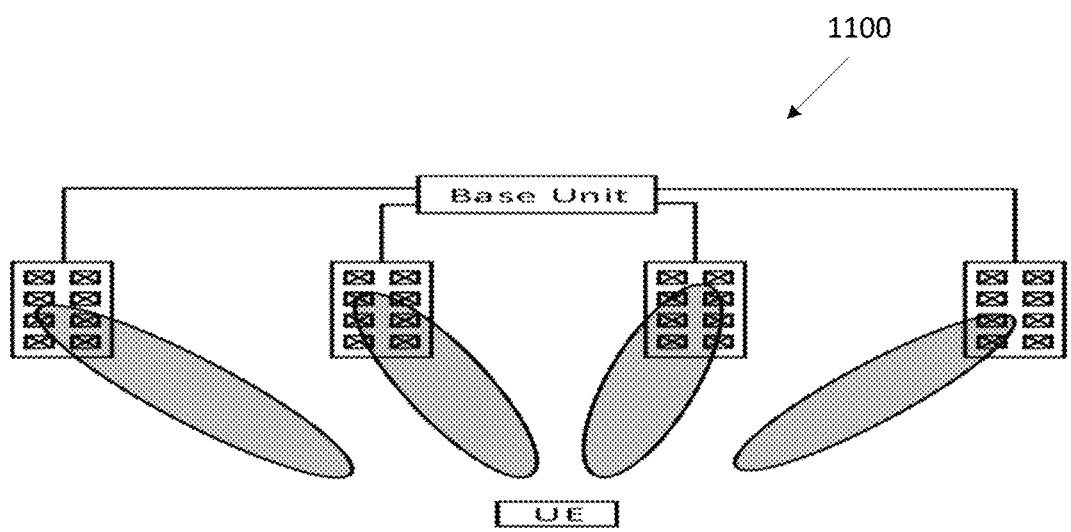
FIG. 11 illustrates an example D-MIMO system according to embodiments of the present disclosure.

FIG. 11 illustrates an example system for D-MIMO 1100 according to embodiments of the present disclosure. The embodiment of the example system for D-MIMO 1100 illustrated in FIG. 11 is for illustration only. FIG. 11 does not limit the scope of this disclosure to any particular implementation of the example system for D-MIMO 1100.

As illustrated in FIG. 11, the multiple antenna panels at multiple locations can still be connected to a single base unit, and thus the signal transmitted/received via multiple distributed panels can be processed in a centralized manner through the single base unit. In another embodiment, it is possible that multiple distributed antenna panels are connected to more than one base units, which communicates with each other and jointly supporting single antenna system.

One issue that can occur in distributed MIMO is that the amount of CSI reporting overhead becomes huge. One approach to resolve the issue of the large CSI overhead is to introduce an efficient CSI codebook tailored for distributed MIMO, for example, using panel/RRH domain compression. The amount of CSI feedback can be drastically reduced by exploiting the channel correlations among panels/RRHs in CSI codebook design. However, in general cases, it is not guaranteed that the channel correlation among panels/RRHs exists, and thus the CSI report comprising all of the CSI for all RRHs/panels without compression may be needed. In this case, if Type-II based multi-panel/multi-RRH codebook is designed and spatial domain (SD) and frequency domain (FD) bases are independently selected for each of the RRHs/panels, the amount of channel coefficients corresponding to SD/FD vector pairs to be reported to the NW will linearly increase with the number of RRHs/panels and thus become very large. Thus, it is expected that multiple CSI reporting instants (blocks) becomes inevitable.

This disclosure proposes multiple CSI reporting methods to support such an issue in distributed MIMO.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI or calibration coefficient reporting setting.

"CSI or calibration coefficient reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band".

The term "CSI or calibration coefficient reporting band" is used only as an example for representing a function. Other terms such as "CSI or calibration coefficient reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 12:
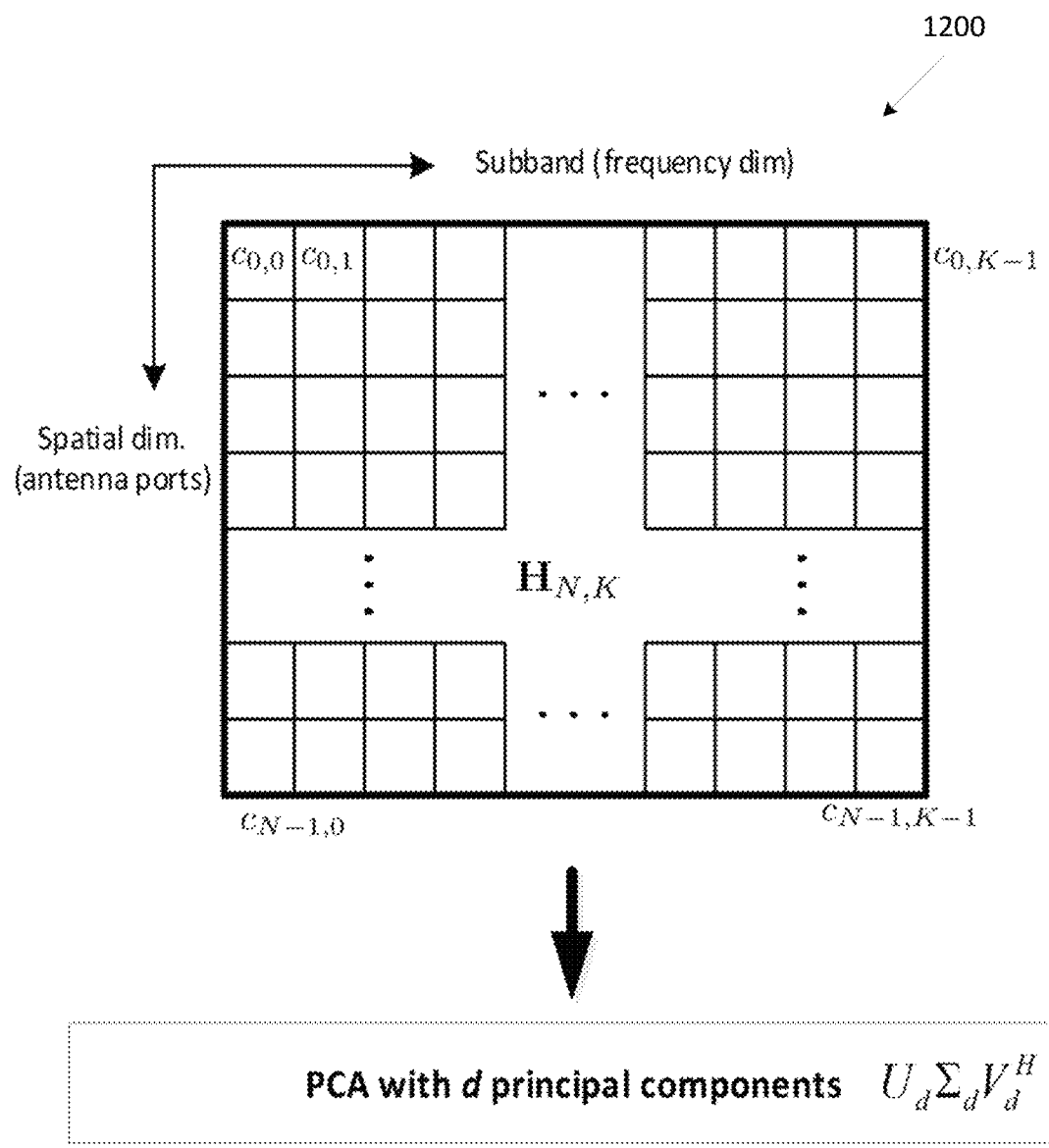
FIG. 12 illustrates an example of an illustration of PCA based explicit CSI compression according to embodiments of the present disclosure.

FIG. 12 illustrates an example of an illustration of PCA based explicit CSI compression 1200 according to embodiments of the present disclosure. The embodiment of the example of an illustration of PCA based explicit CSI compression 1200 illustrated in FIG. 12 is for illustration only. FIG. 12 does not limit the scope of this disclosure to any particular implementation of the example of an illustration of PCA based explicit CSI compression 1200.

In one embodiment I, the UE is configured to report 'explicit CSI' for channels, dominant eigenvectors, or covariance matrix for each subband (SB) based on compression techniques such as principal component analysis (PCA) in order to exploit correlation in spatial (across antennas) and frequency (across SBs) domains jointly.

An illustration of the PCA based explicit CSI compression is shown in FIG. 12. Let N be the number of explicit CSI components that need to be reported in each SB. Although N is used as the number of antenna (or CSI-RS) ports in FIG. 12, the number N can be used in various ways, for example:

Channel: $N=2N_1N_2 \times N_r \times k$

Eigenvectors: $N=2N_1N_2 \times r$

Covariance matrix: $N=2N_1N_2 \times 2N_1N_2$, where $2N_1N_2$ is the number of antenna ports at NW (i.e., $N_1$, $N_2$ are the numbers of antenna ports in $1^{st}$ and $2^{nd}$ dimensions, respectively), $N_r$ is the number of antennas at the UE, r is the number of dominant eigenvectors, and k is the number of subcarriers in a SB for which the DL channel is explicitly reported.

In another example, the channel for each layer p (p-th dominant eigenvector) can be compressed based on PCA.

Let K be the number of SBs for explicit CSI reporting. The UE estimates/measures/derives the un-quantized or analog explicit CSI using DL measurement RS (e.g., CSI-RS) for each SB, then constructs an N×K explicit CSI matrix as $$H_{N,K} = \begin{bmatrix} c_{0,0} & c_{0,1} & \cdots & c_{0,K-1} \\ c_{1,0} & c_{1,1} & \cdots & c_{1,K-1} \\ \vdots & \vdots & \ddots & \vdots \\ c_{N-1,0} & c_{N-1,1} & \cdots & c_{N-1,K-1} \end{bmatrix}$$

where $c_{l,s}$, corresponds to the l-th explicit CSI component for SB s. The singular value decomposition of $H_{N,K}$ is performed to represent $$H_{N,K} = U\Sigma V^H = \sum_{i=0}^{D-1} \sigma_i u_i v_i^H,$$

where
- $U = [u_0 \ u_1 \ \ldots \ u_{D-1}]$ is the left eigenvector matrix (comprising length-N eigenvectors);
- $V = [v_0 \ v_1 \ \ldots \ v_{D-1}]$ is the right eigenvector matrix (comprising length-K eigenvectors);
- $\Sigma = \mathrm{diag}([\sigma_0 \ \sigma_1 \ \ldots \ \sigma_{D-1}])$ is a diagonal matrix of singular values sorted as $\sigma_0 \geq \sigma_1 \geq \ldots \geq \sigma_{D-1}$, and
- $D = \min(K,N)$.

Then, d principal components where $1 \leq d \leq D$ corresponding to 'dominant' singular values $\sigma_0, \ldots \sigma_{d-1}$ and corresponding left and right eigenvector matrices are constructed as $U_d = [u_0 \ u_1 \ldots u_{d-1}]$ $V_d = [v_0 \ v_1 \ldots v_{d-1}]$ $\Sigma_d = \mathrm{diag}([\sigma_0 \ \sigma_1 \ldots \sigma_{d-1}])$.

The reduced dimensional or compressed explicit CSI matrix is then given by $$H_{N,K} \cong \tilde{H}_{N,K} = U_d \Sigma_d V_d^H = \sum_{i=0}^{d-1} \sigma_i u_i v_i^H.$$

To report compressed $H_{N,K}$, the UE uses one of the following alternatives:

Alt 0: The UE transforms the explicit CSI matrix $H_{N,K}$ as $R_d = H_{N,K} V_d$, quantizes $R_d$ and $V_d$ using a codebook, and then reports the quantized matrices to the NW, which reconstructs the explicit CSI matrix as $H_{N,K} = R_d V_d^H$.

Alt 1: The UE quantizes $U_d$, $V_d$, and $\Sigma_d$ using a codebook, and then reports them to the NW, which reconstructs the explicit CSI matrix as $H_{N,K} = U_d \Sigma_d V_d^H$.

In the rest of the disclosure, Alt 1 is assumed for explicit CSI reporting. Embodiments of the disclosure, however, are general and are applicable to Alt 0.

Considering real and imaginary parts of complex numbers separately as two real numbers, the total number of reported (real) explicit CSI components is 2d(K+N)+R, where R=0 for Alt 0 and R=d for Alt 1. So, the total compression achieved before quantization is $$\frac{2KN}{2d(K+N)+R}.$$

In one method, the d value is configured to the UE, e.g., via higher-layer RRC signaling (or L1/L2 signaling via PDCCH/MAC-CE). In another method, the UE reports a preferred d value in the CSI report. In another method, it is fixed, for example to 1.

In one embodiment II, a UE is configured with codebook(s) for $U_d$, $V_d$ and/or $\Sigma_d$, for separate quantization of

- columns of $U_d = [u_0 \ u_1 \ \ldots \ u_{d-1}]$;
- columns of $V_d = [v_0 \ v_1 \ \ldots \ v_{d-1}]$; and
- diagonal elements of $\Sigma_d = \mathrm{diag}([\sigma_0 \ \sigma_0 \ \ldots \ \sigma_{d-1}])$.

In one example, codebooks for two or all of $U_d$, $V_d$ and $\Sigma_d$ can be the same.

In one example, amplitude (or power) codebooks for two or all of $U_d$, $V_d$ and $\Sigma_d$ can be the same (or with possible scaling).

- amplitude codebooks for $U_d$ and $V_d$ can be the same or the same with a scaling factor.
- amplitude codebooks for $U_d$ and $\Sigma_d$ can be the same or the same with a scaling factor.
- amplitude codebooks for $V_d$ and $\Sigma_d$ can be the same or the same with a scaling factor.
- amplitude codebooks for $U_d$, $V_d$, and $\Sigma_d$ can be the same or the same with a scaling factor.

In one example, phase codebooks for $U_d$ and $V_d$ can be the same.

In one embodiment II.1, each element $u_{n,m}$ in a column of $U_d$ can be selected from a codebook comprising phase and amplitude components, where $n \in \{0, 1, \ldots, N-1\}$ and $m \in \{0, 1, \ldots, d-1\}$.

In one example II.1.1, the codebook for phase values can be 4-PSK, 8-PSK, 16-PSK, … or X-PSK, where X-PSK needs $\log_2 X$ bits, where X can be fixed or configured.

In one example II.1.2, the codebook for amplitude values can be a set of Y equidistance points in [0,1]. For example, Y=16 (4-bit amplitude codebook).

In one example II.1.3, the codebook for amplitude values can be a set of Y non-equidistance points in [0,1]. For example, Y=16 (4-bit amplitude codebook) with:

| 4-bit amplitude codebook | |
| --- | --- |
| Index | Amplitude |
| 0 | 0 |
| 1 | $\frac{1}{\sqrt{128}}$ |
| 2 | $\left(\frac{1}{8192}\right)^{\frac{1}{4}}$ |
| 3 | $\frac{1}{8}$ |
| 4 | $\left(\frac{1}{2048}\right)^{\frac{1}{4}}$ |

-continued 4-bit amplitude codebook

| Index | Amplitude |
|---|---|
| 5 | $\frac{1}{2\sqrt{8}}$ |
| 6 | $\left(\frac{1}{512}\right)^{\frac{1}{4}}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{\frac{1}{4}}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

In one example II.1.4, the amplitude value of each element $u_{n,m}$ in a column m of $U_d$ (i.e., the n-th row and m-th column of $U_d$) can be selected from a different codebook.

In one example II.1.4.1, the amplitude values of the elements in column $u_m$ can be selected from the following codebooks:
$|u_{0,m}|$ is selected from a base codebook, for example, the base codebook can be equidistance/non-equidistance $\log_2$ Y-bit amplitude codebook shown in examples II.1.2/II.1.3; and
The amplitude of the j-th row entry, i.e., $|u_{j,m}|$ is selected from a scaled version of the base codebook, for example, $C\ C_j=\{a_j \times c_i | c_i$ is in $C_{base}$ and $0 \leq a_j \leq 1\}$, where $C_{base}$ is the base codebook, and $\forall j=1, \ldots N-1$.

In one example, $a_j$ can be determined as $\sqrt{1-\Sigma_{i=0}^{j-1}|u_{i,m}|^2}$. Note that each eigenvector is a unit-norm vector, and thus it should satisfy that $\Sigma_{i=0}^{N-1}|u_{i,m}|^2=1$. So, the j-th row's amplitude should be less than or equal to $\sqrt{1-\Sigma_{i=0}^{j-1}|u_{i,m}|^2}$. By scaling down by $a_j$ for the codebook for the j-th row's amplitude, the resolution of the codebook can be adaptively increased in a given number of cardinality of the codebook. This is an example of an adaptive codebook, wherein a codebook set for a j-entry can be adaptively modified based on all or some of previously selected j−1 values and a base codebook is used for a first entry.

In one example, the reverse order of the above example can be used, i.e., $|u_{N-1,m}|$ is selected from a base codebook and the amplitude of the j-th row entry $|u_{j,m}|$ is selected from $C_j$ with $a_j=\sqrt{1-\Sigma_{i=j+1}^{N-1}|u_{i,m}|^2}$ for $\forall j=0, \ldots N-2$. In another example, another pre-determined order of row entries for using base codebook and scaled version of the base codebook can be used. In another example, a pre-determined order can be configured or fixed.

Note that since the above examples consider the cases of pre-determined orders and thus no reporting to indicate the order is needed. In one example, the order is reported as part of the CSI report.

In another example, for the j-th row entry, $|u_{j,m}|$ is selected from a confined set of the base codebook, for example, $C_{j,confined}=\{c_i | c_i$ is in $C_{base}$ and $c_i \leq a_j$, where $0 \leq a_j \leq 1\}$, $\forall j=1, \ldots N-1$. This can reduce the amount of bits to represent the codebook $C_{j,confined}$, since it is confined in the set of $\{c_i | c_i \leq a_j\}$. This is an example of an adaptive codebook, wherein a codebook set for a j-entry can be adaptively modified based on all or some of previously selected j−1 values and a base codebook is used for a first entry.

In one example II.1.4.2, the amplitude value of each element $u_{n,m}$ (the n-th row and m-th column of $U_d$) can be selected from a different codebook depending on its magnitude order among the elements in the m-th column vector $u_m$ of $U_d$.

For example, the elements in column $u_m$ can be sorted in the order of magnitude (amplitude), i.e., $|u_{0*,m}| \geq |u_{1*,m}| \geq \ldots \geq |u_{(N-1)*,m}|$ where the subscript i* is the row index corresponding to the i-th largest magnitude among the elements in column $u_m$, and the amplitude for each element can be selected from the following codebooks:
the largest amplitude, i.e., $|u_{0*,m}|$ is selected from a base codebook, for example, the base codebook can be equidistance/non-equidistance $\log_2$ Y-bit amplitude codebook shown in examples II.1.2/II.1.3; and
the j-th largest amplitude, i.e., $|u_{j*,m}|$ is selected from a scaled version of the base codebook, for example, $C_j=\{a_j \times c_i | c_i$ is in $C_{base}$ and $0 \leq a_j < 1\}$, where $C_{base}$ is the base codebook, and $\forall j=1, \ldots N-1$.

In one example, $a_j$ can be determined as $\min(|u_{(j-1)*,m}|, \sqrt{1-\Sigma_{i=0}^{j-1}|u_{i*,m}|^2})$. Note that each eigenvector is a unit-norm vector, and thus $\Sigma_{i=0}^{N-1}|u_{i*,m}|^2=1$. So, the j-th largest amplitude should be less than or equal to $\sqrt{1-\Sigma_{i=0}^{j-1}|u_{i*,m}|^2}$ and the (j−1)-th largest amplitude $|u_{(j-1)*,m}|$ as well. By scaling down by $a_j$ for the codebook for the j-th largest amplitude, the resolution of the codebook can be adaptively increased in a given number of cardinality of the codebook. This is an example of an adaptive codebook (based on a unit-norm property), wherein a codebook set for a j-entry can be adaptively modified based on all or some of previously selected j−1 values and a base codebook is used for a first entry.

Note that an indication for the sorted indices is needed. In one example, an indication with $\log_2$ N! bits (N permutation) to indicate each sorted index is reported.

In another example, the j-th largest amplitude, i.e., $|u_{j*,m}|$ is selected from a confined set of the base codebook, for example, $C_{j,confined}=\{c_i | c_i$ is in $C_{base}$ and $c_i \leq a_j$, where $0 \leq a_j \leq 1\}$, $\forall j=1, \ldots N-1$. This can reduce the amount of bits to represent the codebook $C_{j,confined}$, since it is confined in the set of $\{c_i | c_i a_j\}$. This is an example of an adaptive codebook based, wherein a codebook set for a j-entry can be adaptively modified based on all or some of previously selected j−1 values and a base codebook is used for a first entry.

In another example, a part of the sorted indices only applies example II.1.4.2 and other remaining indices applies example II.1.4.1. For example, the indices corresponding to the $v \in [1, N]$ largest amplitudes are reported (hence $$\log_2 \frac{N!}{(N-v)!}$$

bits are needed to indicate), and for those indices, the codebook $C_{base}$ and the codebook $C_j$ with $a_j=\min(|u_{(j-1)*,m}|, \sqrt{1-\Sigma_{i=0}^{j-1}|u_{i*,m}|^2}$ are used for the largest and the next v−1 largest amplitudes, and the amplitude corresponding to the remaining row index j is selected from $C_j$ with $a_j=\min(|u_{v*,m}|, \sqrt{1-\Sigma_{i=0}^{v-1}|u_{i*,m}|^2-A})$, where A is the sum of the squares of the amplitudes for j−1 remaining entries in a predetermined order.

In one example, v can be configured by NW. In one example, v is fixed to a certain value, e.g., v=1. In another example, v can be determined by UE with a predetermined rule. For example, once $a_j$ becomes smaller than 0.1, the remaining indices are not counted in the set of the v largest amplitudes.

In one embodiment II.2, each element $u_{n,m}$ in a column of $U_d$ can be selected from a codebook comprising phase and power (the square of amplitude) components, where n∈ {0, 1, . . . , N−1} and m∈ {0, 1, . . . , d−1}.

In one example II.2.1, the codebook for phase values can be 4-PSK, 8-PSK, 16-PSK, . . . or X-PSK, where X-PSK needs $\log_2$ X bits.

In one example II.2.2, the codebook for power values can be a set of Y equidistance points in [0,1]. For example, Y=16 (4-bit amplitude codebook).

In one example II.2.3, the codebook for power values can be a set of Y non-equidistance points in [0,1]. For example, Y=16 (4-bit amplitude codebook) with the codebook wherein each element is the square of each element in the 4-bit amplitude codebook shown in example II.1.3.

In one example II.2.4, the power value of each element $u_{n,m}$ in a column m of $U_d$ (i.e., the n-th row and m-th column of $U_d$) can be selected from a different codebook.

In one example II.2.4.1, the power values of the elements in column $u_m$ can be selected the codebooks wherein each element is the square of each element of the codebooks, respectively, shown in example II.1.4.1.

In one example II.2.4.2, the power values of the elements in column $u_m$ can be selected the codebooks wherein each element is the square of each element of the codebooks, respectively, shown in example II.1.4.2.

In one embodiment II.3, each column of $U_d$ can be selected from a codebook comprising unit-norm vectors.

In one embodiment II.4, $U_d$ can be selected from a codebook comprising a set of matrices of size N×d whose columns are unit-norm and orthogonal.

In one embodiment II.5, each element $v_{k,l}$ in a column of $V_d$ can be selected from a codebook comprising phase and amplitude components, where k∈ {0, 1, . . . , K−1} and l∈ {0, 1, d−1}.

In one example II.5.1, the codebook for phase values can be 4-PSK, 8-PSK, 16-PSK, . . . or X-PSK, where X-PSK needs $\log_2$ X bits.

In one example II.5.2, the codebook for amplitude values can be a set of Y equidistance points in [0,1]. For example, Y=16 (4-bit amplitude codebook).

In one example II.5.3, the codebook for amplitude values can be a set of Y non-equidistance points in [0,1]. For example, Y=16 (4-bit amplitude codebook) with the 4-bit amplitude codebook shown in example II.1.3.

In one example II.5.4, the amplitude value of each element $v_{k,l}$ in a column Z of $V_d$ (i.e., the k-th row and l-th column of $V_d$) can be selected from a different codebook.

In one example II.5.4.1, the amplitude values of the elements in column $v_l$ can be selected the codebooks, generated by the same approach according to the example II.1.4.1.

In one example II.5.4.2, the amplitude values of the elements in column $v_l$ can be selected the codebooks, generated by the same approach according to the example II.1.4.2.

In one embodiment II.6, each element $v_{k,l}$ in a column of $V_d$ can be selected from a codebook comprising phase and power (the square of amplitude) components, where k∈ {0, 1, . . . , K−1} and l∈ {0, 1, . . . , d−1}.

In one example II.6.1, the codebook for phase values can be 4-PSK, 8-PSK, 16-PSK, . . . or X-PSK, where X-PSK needs $\log_2$ X bits.

In one example II.6.2, the codebook for power values can be a set of Y equidistance points in [0,1]. For example, N=16 (4-bit amplitude codebook).

In one example II.6.3, the codebook for power values can be a set of Y non-equidistance points in [0,1]. For example, N=16 (4-bit amplitude codebook) with the codebook wherein each element is the square of each element in the 4-bit amplitude codebook shown in example II.1.3.

In one example II.6.4, the power value of each element $v_{k,l}$ in a column l of $V_d$ (i.e., the k-th row and l-th column of $V_d$) can be selected from a different codebook.

In one example II.6.4.1, the power values of the elements in column $v_m$ can be selected the codebooks wherein each element is the square of each element of the codebooks, respectively, shown in example II.5.4.1.

In one example II.6.4.2, the power values of the elements in column $v_m$ can be selected the codebooks wherein each element is the square of each element of the codebooks, respectively, shown in example II.5.4.2.

In one embodiment II.7, each column of $V_d$ can be selected from a codebook comprising unit-norm vectors.

In one embodiment II.8, $V_d$ can be selected from a codebook comprising a set of matrices of size N×d whose columns are unit-norm and orthogonal.

In embodiment II.9, the diagonal elements of $\Sigma_d$ can be selected from codebook(s) according to one of the following examples.

In one example II.9.1, the codebook for diagonal entries of $\Sigma_d$ can be a set of Z equidistance points in [0, A]. For example, A=10, Z=16 (4-bit codebook for singular values). The value A can be fixed, or configured, or reported by the UE (as part of the CSI report).

In one example II.9.2, the codebook for diagonal entries of $\Sigma_d$ can be a set of Z non-equidistance points in [0, A]. For example, A=10, Z=16 (4-bit codebook for singular values) with:

| 4-bit codebook for singular values | |
| --- | --- |
| Index | Amplitude |
| 0 | 0 |
| 1 | $A \times \frac{1}{\sqrt{128}}$ |
| 2 | $A \times \left(\frac{1}{8192}\right)^{\frac{1}{2}}$ |

4-bit codebook for singular values

| Index | Amplitude |
|---|---|
| 3 | $A \times \frac{1}{64}$ |
| 4 | $A \times \left(\frac{1}{2048}\right)^{\frac{1}{2}}$ |
| 5 | $A \times \frac{1}{32}$ |
| 6 | $A \times \left(\frac{1}{512}\right)^{\frac{1}{2}}$ |
| 7 | $A \times \frac{1}{16}$ |
| 8 | $A \times \left(\frac{1}{128}\right)^{\frac{1}{2}}$ |
| 9 | $A \times \frac{1}{8}$ |
| 10 | $A \times \left(\frac{1}{32}\right)^{\frac{1}{2}}$ |
| 11 | $A \times \frac{1}{4}$ |
| 12 | $A \times \left(\frac{1}{8}\right)^{\frac{1}{2}}$ |
| 13 | $A \times \frac{1}{2}$ |
| 14 | $A \times \left(\frac{1}{2}\right)^{\frac{1}{2}}$ |
| 15 | $A$ |

The value A can be fixed, or configured, or reported by the UE (as part of the CSI report).

In one example II.9.3, each diagonal element of $\Sigma_d$ can be selected from a different codebook in the following manner:
- the 0-th diagonal element, i.e., $\sigma_0$, is selected from a base codebook. For example, the base codebook can be either example II.9.1 or II.9.2.
- the j-th diagonal element, i.e., $\sigma_j$ is selected from a scaled version of a base codebook, for example, $\mathcal{C}_{j,\Sigma}=\{b_j \times c_i | c_i$ is in $\mathcal{C}_{base,\Sigma}$ and $0 \leq a_j \leq 1\}$, where $\mathcal{C}_{base,\Sigma}$ is the base codebook, and $\forall j=1, \ldots d-1$.

In one example, $b_j$ can be determined as the ratio of the selected value $\sigma_{j-1}$ to the maximum value of $\mathcal{C}_{base,\Sigma}$. That is, $$b_j = \frac{\sigma_{j-1}}{c_{max,\Sigma}},$$

where $c_{max,\Sigma} = \max \mathcal{C}_{base,\Sigma}$. In one example, if the base codebook is either example II.9.1 or II.9.2, $c_{max,\Sigma}=A$. Note that it guarantees the maximum value of $\mathcal{C}_{j,\Sigma}$ does not exceed $\sigma_{j-1}$ and thus $\sigma_j$ can be selected from the codebook ranging from 0 to $\sigma_{j-1}$ with keeping the constraint $\sigma_0 \geq \sigma_1 \ldots \geq \sigma_{d-1}$. By scaling down by $b_j$ for the codebook for the j-th diagonal element, the resolution of the codebook can be adaptively increased in a given number of cardinality of the codebook. This is an example of an adaptive codebook, wherein a codebook set for a j-entry can be adaptively modified based on all or some of previously selected j−1 values and a base codebook is used for a first entry.

In one embodiment III, a UE is configured to report explicit CSI for R multiple RRHs (or panels) based on compression techniques such as PCA compression, $R \geq 1$.

In one embodiment III.1, each channel for each of multiple RRHs/panels can be represented as $H_{N_{RRH,l}K}$ for $l=0, 1, \ldots, R-1$, where $N_{RRH,l}$ is the explicit CSI component, for each SB, at RRH/panel l. In one example, $N_{RRH,l}=2N_{1,l}N_{2,l}$, where $N_{1,l}$ and $N_{2,l}$ are the numbers of antenna ports in $1^{st}$ and $2^{nd}$ dimensions, respectively, at RRH l. In another example, $N_{RRH,l}=2N_{1,l}N_{2,l} \times N_r$.

A UE is configured to estimate/quantize/derive each $H_{N_{RRH,l}K}$ based on PCA compression/codebook (i.e., via component I) and the compressed and quantized channels can be represented as:

$$H_{N_{RRH,l}K} \cong \tilde{H}_{H_{RRH,l}K} = U_{d,l}\Sigma_{d,l}V_{d,l}^H = \Sigma_{i=0}^{d-1}\sigma_{i,l}u_{i,l}v_{i,l}^H,$$
for $l=0,1,\ldots,R-1$, where $U_{d,l}\Sigma_{d,l}V_{d,l}$ are selected from codebooks, e.g., that can be designed according to component II.

The value d can be the same for all RRHs. Or, the value d can be specific to each RRH, For example, $d_l$ can be used for RRH l, where $d_l$ value can be different across RRHs. In rest of the disclosure, the same d value assumed for simplicity. The embodiments can be extended to the different $d_l$ value case.

In one embodiment III.1.1, a UE is configured to report all CSI of $\{U_{d,l}, \Sigma_{d,l}, V_{d,l}\}_{l=0}^{R-1}$ for all RRHs/panels at once.

In one example III.1.1.1, inter-RRH/panel component can be contained in addition to the CSI of $\{U_{d,l}, \Sigma_{d,l}, V_{d,l}\}_{l=0}^{R-1}$.
In one example, inter-RRH/panel component can contain either phase and amplitude values, phase and power values, or phase value only. The phase, amplitude, and power values can be selected codebooks, e.g., designed according to the examples II.1.1, II.1.2, II.1.3, II.2.2, and II.2.3.

In one example III.1.1.2, inter-RRH/panel component is not contained in the CSI reporting. In this case, the CSI of $\{U_{d,l}, \Sigma_{d,l}, V_{d,l}\}_{l=0}^{R-1}$ take care of all CSI including the part corresponding to inter-RRH/panel component.

In one embodiment III.1.2, a UE is configured to report all CSI of $\{U_{d,l}, \Sigma_{d,l}, V_{d,l}\}_{l=0}^{R-1}$ for all RRHs/panels using multiple CSI reporting instants.

In one example III.1.2.1, each CSI reporting instant contains part of PCA components for all CSI. For example, two CSI reporting instants can be configured to report all CSI, and the UE is configured to report $d_1$ PCA components at the first CSI reporting instant and $d_2$ PCA component at the second CSI reporting instant. That is, the UE reports:

$U_{d_1,l}\Sigma_{d_1,l}V_{d_1,l}^H = \Sigma_{i=0}^{d_1-1}\sigma_{i,l}u_{i,l}v_{i,l}^H$, $\forall l=0, 1, \ldots, R-1$, at the first CSI reporting instant (main CSI reporting stage)

$U_{d_2,l}\Sigma_{d_2,l}V_{d_2,l}^H = \Sigma_{i=d_1}^{d_1+d_2-1}\sigma_{i,l}u_{i,l}v_{i,l}^H$, $\forall l=0, 1, \ldots, R-1$, at the second CSI reporting instant (refinement CSI reporting stage)

It can be extended to the cases having more than two CSI reporting instants.

In one example III.1.2.2, inter-RRH/panel component can be contained in addition to the CSI of $\{U_{d,l}, \Sigma_{d,l}, V_{d,l}\}_{l=0}^{R-1}$, similar to example III.1.1.1.

In one example III.1.2.3, inter-RRH/panel component is not contained in the CSI reporting, similar to example III.1.1.2.

In embodiment III.1.3, a UE is configured to report each CSI of $U_{d,l}$, $\Sigma_{d,l}$, $V_{d,l}$ for each RRH/panel l at each CSI reporting instant. In this case, R multiple CSI reporting instants are configured for UE to report all CSI.

In one example III.1.3.1, d can be differently configured for each RRH/panel l. In this case, UE can report:

$U_{d_l,l}\Sigma_{d_l,l}V_{d_l,l}^H = \Sigma_{i=0}^{d_l-1} \sigma_{i,l}u_{i,l}v_{i,l}^H$, at CSI reporting instant t.

In one example, CSI reporting instant t can be different RRH/panel index l. For example, the order of CSI reporting instant t for RRH/panel l can be determined by the channel quality among the channels of the RRHs.

In one example III.1.3.2, inter-RRH/panel component can be contained in addition to the CSI of $\{U_{d,l}, \Sigma_{d,l}, V_{d,l}\}_{l=0}^{R-1}$, similar to example III.1.1.1.

In one example III.1.3.3, inter-RRH/panel component is not contained in the CSI reporting, similar to example III.1.1.2.

In one embodiment III.1.4, a UE is configured to report each CSI of $U_{d,l}$, $\Sigma_{d,l}$, $V_{d,l}$ for each RRH/panel l using multiple CSI reporting instants. In this case, the total number of CSI reporting instants to report all CSI for all RRHs/panels can be represented as $N_{CSI} = \Sigma_l N_{CSI,l}$, where $N_{CSI,l}$ is the number of CSI reporting instants for RRH/panel l. In one example, $N_{CSI,l} = 2$, $\forall l$, hence $N_{CSI} = 2R$.

In one example III.1.4.1, each CSI reporting instant contains part of PCA components for the CSI for RRH/panel l. For example, two CSI reporting instants can be configured to report the CSI for each RRH/panel, and the UE is configured to report $d_1$ PCA components at the first CSI reporting instant and $d_2$ PCA component at the second CSI reporting instant. That is, UE reports:

$U_{d_1,l}\Sigma_{d_1,l}V_{d_1,l}^H = \Sigma_{i=0}^{d_1-1} \sigma_{i,l}u_{i,l}v_{i,l}^H$, at the second CSI reporting instant (refinement CSI reporting stage) for RRH/panel l, $U_{d_2,l}\Sigma_{d_2,l}V_{d_2,l}^H = \Sigma_{i=d_1}^{d_1+d_2-1} \sigma_{i,l}u_{i,l}v_{i,l}^H$, at the first CSI reporting instant (main CSI reporting stage) for RRH/panel l.

In one example, $d_1$ and $d_2$ can be differently configured for different RRH/panel.

In one example, it can be extended to the cases having more than two CSI reporting instants for each RRH.

In one example III.1.4.2, inter-RRH/panel component can be contained in addition to the CSI of $\{U_{d,l}, \Sigma_{d,l}, V_{d,l}\}_{l=0}^{R-1}$, similar to example III.1.1.1.

In one example III.1.4.3, inter-RRH/panel component is not contained in the CSI reporting, similar to example III.1.1.2.

In one embodiment III.1.5, a UE is configured to report each group CSI of $\{U_{d,l}, \Sigma_{d,l}, V_{d,l}\}_{l\in G_i}$ using multiple CSI reporting instants, where R RRHs/panels are partitioned into groups $\{G_i\}_{i=0}^{G-1}$. In this case, the total number of CSI reporting instants to report all CSI for all RRHs/panels can be represented as $N_{CSI} = \Sigma_{i=0}^{G-1} N_{CSI,i}$, where $N_{CSI,i}$ is the number of CSI reporting instants for the group $G_i$ of RRHs/panels. In one example, $N_{CSI,i} = 2$, $\forall i$, hence $N_{CSI} = 2G$.

In one example III.1.5.1, each CSI reporting instant contains part of PCA components for the CSI of the RRHs/panels in group $G_i$. For example, two CSI reporting instants can be configured to report the CSI of the RRHs/panels in group $G_i$, and the UE is configured to report $d_1$ PCA components at the first CSI reporting instant and $d_2$ PCA component at the second CSI reporting instant. That is, UE reports:

$U_{d_1,l}\Sigma_{d_1,l}V_{d_1,l}^H = \Sigma_{i=0}^{d_1-1} \sigma_{i,l}u_{i,l}v_{i,l}^H$, $\forall l \in G_i$, at the first CSI reporting instant (main CSI reporting stage) for group $G_i$, $U_{d_2,l}\Sigma_{d_2,l}V_{d_2,l}^H = \Sigma_{i=d_1}^{d_1+d_2-1} \sigma_{i,l}u_{i,l}v_{i,l}^H$, $\forall l \in G_i$, at the second CSI reporting instant (refinement CSI reporting stage) for group $G_i$.

In one example, $d_1$ and $d_2$ can be differently configured for different group of RRHs/panels.

In one example, it can be extended to the cases having more than two CSI reporting instants for each group of RRHs/panels.

In one example III.1.5.2, inter-RRH/panel component can be contained in addition to the CSI of $\{U_{d,l}, \Sigma_{d,l}, V_{d,l}\}_{l=0}^{R-1}$, similar to example III.1.1.1.

In one example III.1.5.3, inter-RRH/panel component is not contained in the CSI reporting, similar to example III.1.1.2.

In one embodiment III.2, R multiple RRHs/panels are partitioned into groups $\{\mathcal{P}_j\}_{j=0}^{P-1}$ and the channels for the RRHs/panels in each group $\mathcal{P}_j$ can be represented as $H_{N_{RRHs,\mathcal{P}_j}K}$ for $j=0, 1, \ldots, P-1$, where $N_{RRHs,\mathcal{P}_j}$ is the explicit CSI component, for each SB, at the RRHs/panels in group $\mathcal{P}_j$. In one example, $N_{RRHs,\mathcal{P}_j} = 2\Sigma_{\ell \in \mathcal{P}_j} N_{1,l}N_{2,l}$, where $N_{1,l}$ and $N_{2,l}$ are the numbers of antenna ports in $1^{st}$ and $2^{nd}$ dimensions, respectively, at RRH l in group $\mathcal{F}$. In another example, $N_{RRHs,\mathcal{P}_j} = 2\Sigma_{\ell \in \mathcal{P}_j} N_{1,l}N_{2,l} \times N_r$.

A UE is configured to estimate/quantize/derive $H_{N_{RRHs,\mathcal{P}_j}K}$ based on PCA compression/codebook (i.e., via component I) and the compressed and quantized channels can be represented as:

$$H_{N_{RRHs,\mathcal{P}_j}K} \cong \tilde{H}_{N_{RRHs,\mathcal{P}_j}K} = U_{d,\mathcal{P}_j} \Sigma_{d,\mathcal{P}_j} V_{d,\mathcal{P}_j}^H = \Sigma_{i=0}^{d-1} \sigma_{i,\mathcal{P}_j} u_{i,\mathcal{P}_j} v_{i,\mathcal{P}_j}^H, \text{ for } j=0,1,\ldots,P-1,$$

where $u_{d,\mathcal{P}_j}$, $\Sigma_{d,\mathcal{P}_j}$, $v_{d,\mathcal{P}_j}$ are selected from codebooks, e.g., that can be designed according to component II.

In one example, P=1, which considers all channels for all RRHs/panels to be compressed jointly.

In embodiments III.2.1, III.2.2, III.2.3, III.2.4, and III.2.5, direct extensions of embodiments III.1.1, III.1.2, III.1.3, III.1.4, and III.1.5 by replacing $U_{d,l}$, $\Sigma_{d,l}$, $V_{d,l}$ by $u_{d,\mathcal{P}_j}$, $\Sigma_{d,\mathcal{P}_j}$, $v_{d,\mathcal{P}_j}$ are utilized.

Any of the above variation embodiments can be utilized independently or in combination with at least one other variation embodiment.

Figure 13:
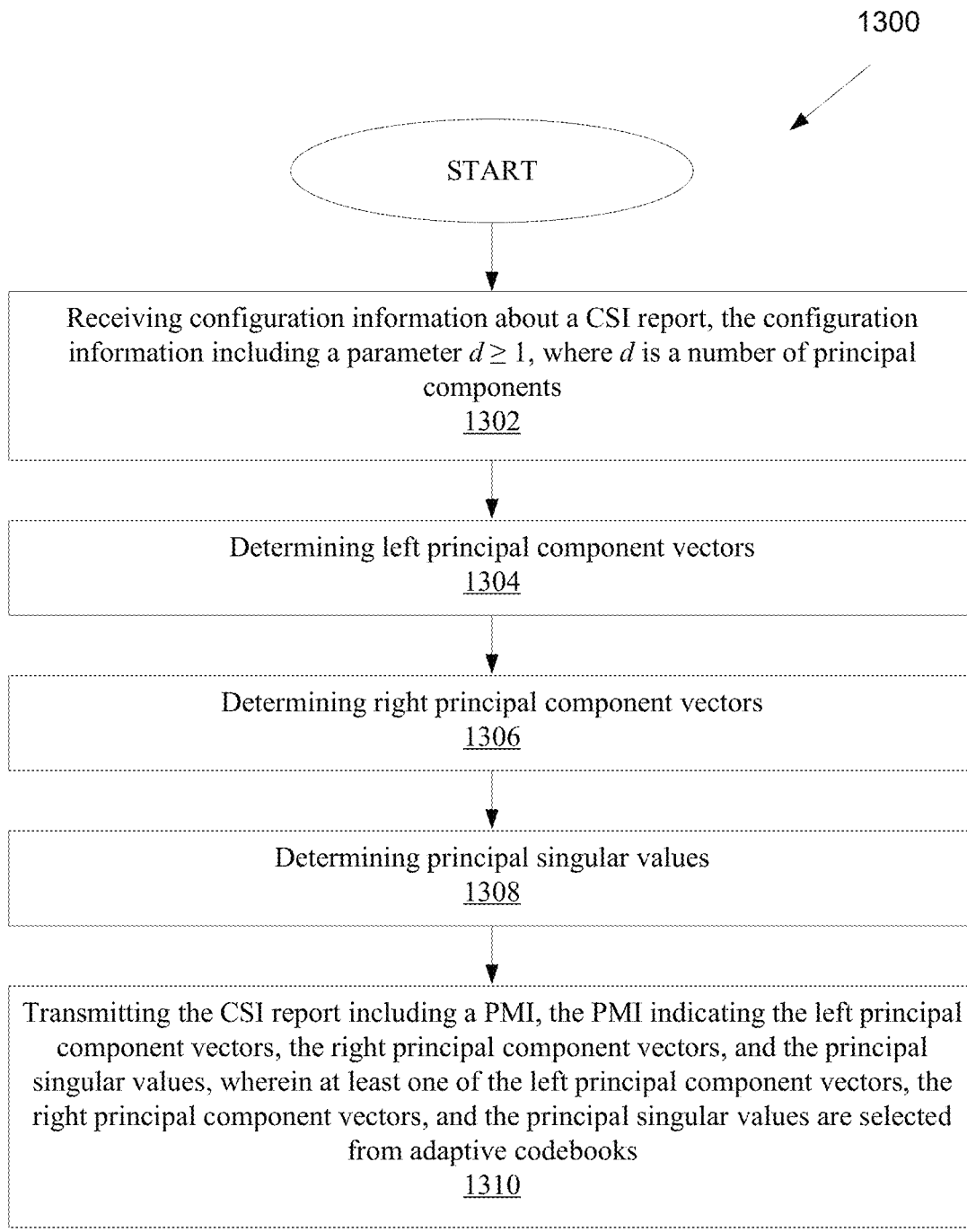
FIG. 13 illustrates a flow chart of a method for operating a UE according to embodiments of the present disclosure.

FIG. 13 illustrates a flow chart of a method 1300 for operating a user equipment (UE), as may be performed by a UE such as UE 116, according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the UE (e.g., 111-116 as illustrated in FIG. 1) receives configuration information about a CSI report, the configuration information including a parameter d≥1, where d is a number of principal components.

In step 1304, the UE determines left principal component vectors.

In step 1306, the UE determines right principal component vectors.

In step 1308, the UE determines principal singular values.

In step 1310, the UE transmits the CSI report including a PMI, the PMI indicating the left principal component vectors, the right principal component vectors, and the principal singular values, wherein at least one of the left principal component vectors, the right principal component vectors, and the principal singular values are selected from adaptive codebooks.

In one embodiment, the UE selects a respective amplitude of elements of one of the left principal component vectors from an adaptive codebook based on a unit-norm property.

In one embodiment, the UE selects an amplitude of a first element from a first base codebook; selects an amplitude of a j-th element from a scaled version of the first base codebook; and computes a scaling factor based on respective amplitudes of previous j−1 elements.

In one embodiment, the UE selects an amplitude of a first element from a first base codebook; selects an amplitude of a j-th element from a confined set of the first base codebook; and determines elements of the confined set based on respective amplitudes of previous j−1 elements.

In one embodiment, the UE selects a respective amplitude of elements of one of the right principal component vectors an adaptive codebook based on a unit-norm property.

In one embodiment, the UE selects an amplitude of a first element from a second base codebook; selects an amplitude of a j-th element from a scaled version of the second base codebook; and computes a scaling factor based on respective amplitudes of previous j−1 elements.

In one embodiment, the UE selects an amplitude of a first element from a second base codebook; selects an amplitude of a j-th element from a confined set of the second base codebook; and determines elements of the confined set based on respective amplitudes of previous j−1 elements.

In one embodiment, the UE selects a first principal singular value from a third base codebook; selects a j-th principal singular value from a scaled version of the third base codebook; and computes a scaling factor based on a j−1 principal singular value.

Figure 14:
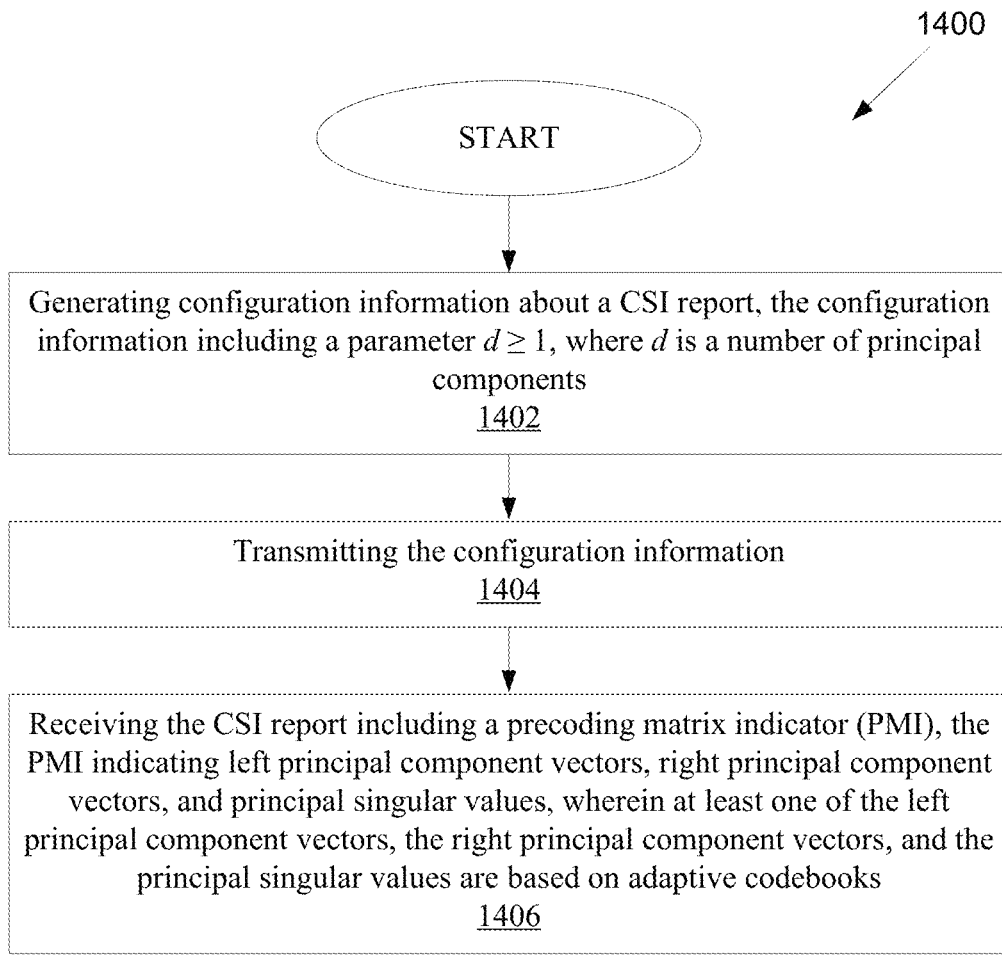
FIG. 14 illustrates a flow chart of a method for operating a BS according to embodiments of the present disclosure.

FIG. 14 illustrates a flow chart of another method 1400, as may be performed by a base station (BS) such as BS 102, according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the BS (e.g., 101-103 as illustrated in FIG. 1), generates configuration information about a channel state information (CSI) report, the configuration information including a parameter d≥1, where d is a number of principal components.

In step 1404, the BS transmits the configuration information.

In step 1406, the BS receives the CSI report including a precoding matrix indicator (PMI), the PMI indicating left principal component vectors, right principal component vectors, and principal singular values, wherein at least one of the left principal component vectors, the right principal component vectors, and the principal singular values are based on adaptive codebooks.

In one embodiment, a respective amplitude of elements of one of the left principal component vectors is based on a first adaptive codebook based on a first unit-norm property, and a respective amplitude of elements of one of the right principal component vectors is based on a second adaptive codebook based on a second unit-norm property.

In one embodiment, an amplitude of a first element of one of the left principal component vectors is based on a first base codebook, an amplitude of a j-th element of one of the left principal component vectors is based on a scaled version of the first base codebook, a scaling factor of one of the left principal component vectors is based on respective amplitudes of previous j−1 elements of the left principal component vectors, an amplitude of a first element of one of the right principal component vectors is based on a second base codebook, an amplitude of a j-th element of one of the right principal component vectors is based on a scaled version of the second base codebook, and a scaling factor of one of the right principal component vectors is based on respective amplitudes of previous j−1 elements of the right principal component vectors.

In one embodiment, an amplitude of a first element of one of the left principal component vectors is based on a first base codebook, an amplitude of a j-th element of one of the left principal component vectors is based on a confined set of the first base codebook, elements of the confined set are based on respective amplitudes of previous j−1 elements of one of the left principal component vectors, an amplitude of a first element of one of the right principal component vectors is based on a second base codebook, an amplitude of a j-th element of one of the right principal component vectors is based on a confined set of the second base codebook, and elements of the confined set are based on respective amplitudes of previous j−1 elements of one of the right principal component vectors.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive configuration information about a channel state information (CSI) report, the configuration information including a parameter d≥1, where d is a number of principal components; and
a processor operably coupled to the transceiver, the processor configured to:
determine principal singular values,
wherein the transceiver is further configured to transmit the CSI report including a precoding matrix indicator (PMI), the PMI indicating the principal singular values, wherein the principal singular values are selected from adaptive codebooks, and
wherein:
a first principal singular value is selected from a first base codebook,
a j-th principal singular value is selected from a scaled version of the first base codebook, and
a scaling factor is computed based on a j−1 principal singular value, where j is equal to one of: 1, . . . , d−1.

2. The UE of claim 1, wherein the processor is further configured to:
determine left principal component vectors; and
determine right principal component vectors, wherein the PMI further indicates the left principal component vectors and the right principal component vectors, wherein at least one of the left principal component vectors and the right principal component vectors are selected from adaptive codebooks.

3. The UE of claim 2, wherein a respective amplitude of elements of one of the left principal component vectors is selected from an adaptive codebook based on a unit-norm property.

4. The UE of claim 3, wherein:
an amplitude of a first element is selected from a second base codebook,
an amplitude of a j-th element is selected from a scaled version of the second base codebook, and
a scaling factor is computed based on respective amplitudes of previous j−1 elements.

5. The UE of claim 3, wherein:
an amplitude of a first element is selected from a second base codebook,
an amplitude of a j-th element is selected from a confined set of the second base codebook, and
elements of the confined set are determined based on respective amplitudes of previous j−1 elements.

6. The UE of claim 2, wherein a respective amplitude of elements of one of the right principal component vectors is selected from an adaptive codebook based on a unit-norm property.

7. The UE of claim 6, wherein:
an amplitude of a first element is selected from a third base codebook,
an amplitude of a j-th element is selected from a scaled version of the third base codebook, and
a scaling factor is computed based on respective amplitudes of previous j−1 elements.

8. The UE of claim 6, wherein:
an amplitude of a first element is selected from a third base codebook,
an amplitude of a j-th element is selected from a confined set of the third base codebook, and
elements of the confined set are determined based on respective amplitudes of previous j−1 elements.

9. A base station (BS) comprising:
a processor configured to generate configuration information about a channel state information (CSI) report, the configuration information including a parameter d≥1, where d is a number of principal components; and
a transceiver operably coupled to the processor, the transceiver configured to:
transmit the configuration information; and
receive the CSI report including a precoding matrix indicator (PMI), the PMI indicating principal singular values, wherein the principal singular values are based on adaptive codebooks,
wherein:
a first principal singular value is selected from a first base codebook,
a j-th principal singular value is selected from a scaled version of the first base codebook, and
a scaling factor is computed based on a j−1 principal singular value, where j is equal to one of: 1, . . . , d−1.

10. The BS of claim 9, wherein:
the PMI further indicates left principal component vectors and right principal component vectors, wherein at least one of the left principal component vectors and the right principal component vectors are based on adaptive codebooks,
a respective amplitude of elements of one of the left principal component vectors is based on a first adaptive codebook based on a first unit-norm property, and
a respective amplitude of elements of one of the right principal component vectors is based on a second adaptive codebook based on a second unit-norm property.

11. The BS of claim 10, wherein:
an amplitude of a first element of one of the left principal component vectors is based on a second base codebook,
an amplitude of a j-th element of one of the left principal component vectors is based on a scaled version of the second base codebook,
a scaling factor of one of the left principal component vectors is based on respective amplitudes of previous j−1 elements of the left principal component vectors,
an amplitude of a first element of one of the right principal component vectors is based on a third base codebook,
an amplitude of a j-th element of one of the right principal component vectors is based on a scaled version of the third base codebook, and
a scaling factor of one of the right principal component vectors is based on respective amplitudes of previous j−1 elements of the right principal component vectors.

12. The BS of claim 10, wherein:
an amplitude of a first element of one of the left principal component vectors is based on a second base codebook,
an amplitude of a j-th element of one of the left principal component vectors is based on a confined set of the second base codebook,
elements of the confined set are based on respective amplitudes of previous j−1 elements of one of the left principal component vectors,
an amplitude of a first element of one of the right principal component vectors is based on a third base codebook,
an amplitude of a j-th element of one of the right principal component vectors is based on a confined set of the third base codebook, and
elements of the confined set are based on respective amplitudes of previous j−1 elements of one of the right principal component vectors.

13. A method for operating a user equipment (UE), the method comprising:
receiving configuration information about a channel state information (CSI) report, the configuration information including a parameter d≥1, where d is a number of principal components;
determining principal singular values;
transmitting the CSI report including a precoding matrix indicator (PMI), the PMI indicating the principal singular values, wherein the principal singular values are selected from adaptive codebooks;
selecting a first principal singular value from a first base codebook;
selecting a j-th principal singular value from a scaled version of the first base codebook; and
computing a scaling factor based on a j−1 principal singular value, where j is equal to one of: 1, . . . , d−1.

14. The method of claim 13, further comprising:
determining left principal component vectors; and
determining right principal component vectors,
wherein the PMI further indicates the left principal component vectors and the right principal component vectors, wherein at least one of the left principal component vectors and the right principal component vectors are selected from adaptive codebooks.

15. The method of claim 14, further comprising selecting a respective amplitude of elements of one of the left principal component vectors from an adaptive codebook based on a unit-norm property.

16. The method of claim 15, further comprising:
selecting an amplitude of a first element from a second base codebook;
selecting an amplitude of a j-th element from a scaled version of the second base codebook; and
computing a scaling factor based on respective amplitudes of previous j−1 elements.

17. The method of claim 15, further comprising:
selecting an amplitude of a first element from a second base codebook;
selecting an amplitude of a j-th element from a confined set of the second base codebook; and
determining elements of the confined set based on respective amplitudes of previous j−1 elements.

18. The method of claim 14, further comprising selecting a respective amplitude of elements of one of the right principal component vectors an adaptive codebook based on a unit-norm property.

19. The method of claim 18, further comprising:
selecting an amplitude of a first element from a third base codebook;
selecting an amplitude of a j-th element from a scaled version of the third base codebook; and
computing a scaling factor based on respective amplitudes of previous j−1 elements.

20. The method of claim 18, further comprising:
selecting an amplitude of a first element from a third base codebook;
selecting an amplitude of a j-th element from a confined set of the third base codebook; and
determining elements of the confined set based on respective amplitudes of previous j−1 elements.

* * * * *